F. F. FARRAR & F. P. GILL.
Process and Apparatus for Recovering Waste Sulphuric Acid.
No. 206,309. Patented July 23, 1878.

4 Sheets—Sheet 2.

F. F. FARRAR & F. P. GILL.
Process and Apparatus for Recovering Waste Sulphuric Acid.

No. 206,309. Patented July 23, 1878.

Witnesses,

Jas. B. Miller.
D. H. Dean

Inventors,

Fernando F. Farrar
Frank P. Gill
Per, Jno. K. Hallock
Att'y.

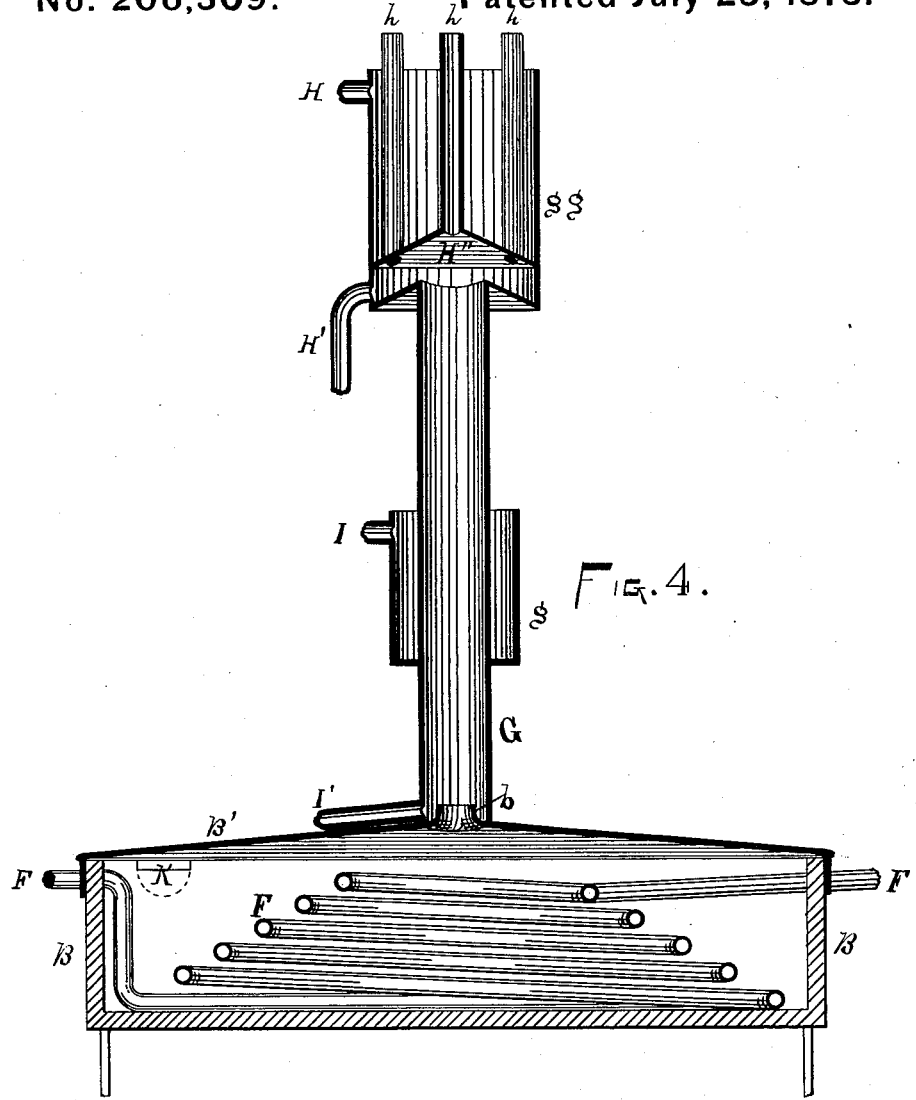

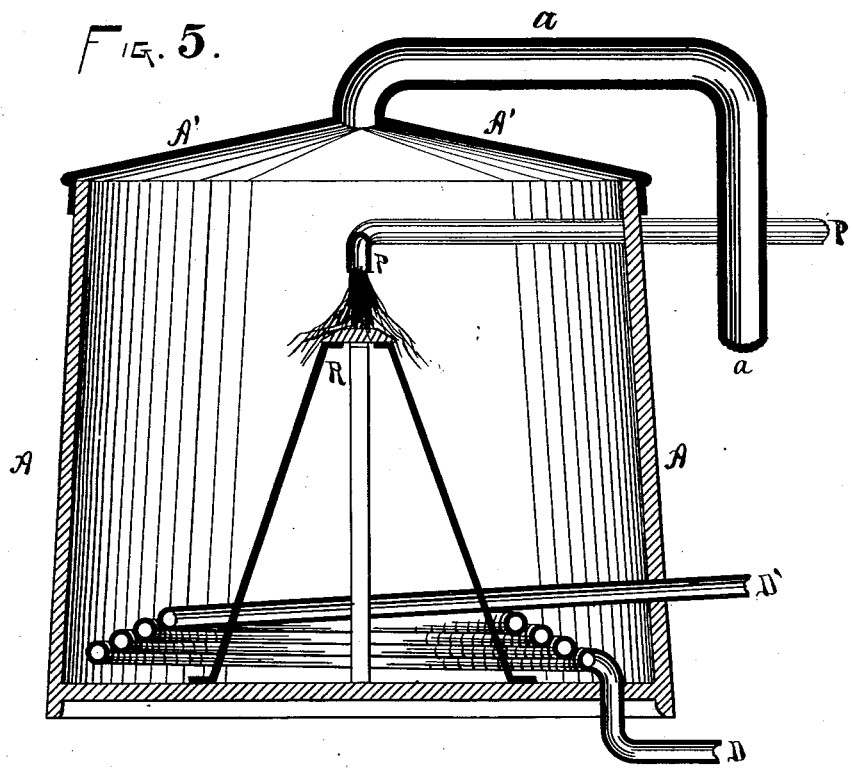

UNITED STATES PATENT OFFICE.

FERNANDO F. FARRAR AND FRANK P. GILL, OF WATERFORD, PENNSYL VANIA; SAID GILL ASSIGNOR TO SAID FARRAR.

IMPROVEMENT IN PROCESSES AND APPARATUS FOR RECOVERING WASTE SULPHURIC ACID.

Specification forming part of Letters Patent No. 206,309, dated July 23, 1878; application filed March 30, 1878.

*To all whom it may concern:*

Be it known that we, FERNANDO F. FARRAR and FRANK P. GILL, of Waterford, in the county of Erie and State of Pennsylvania, have invented new and useful Processes and Devices for Restoring Acid from Spent Tar of Oil-Refineries; and we do hereby declare the following to be a full, clear, and exact description thereof.

Our invention relates to the art of reclaiming or restoring acid from the residuum or spent tar from petroleum-refineries, so that it can again be used.

Our invention consists of the improved process and devices hereinafter fully set forth.

The object of our process is to so treat the tar as to avoid carbonizing it by the heat applied to it in its treatment, and also to obtain a more perfect separation of the acid from the tar.

The object of our improved devices is to carry out our new process in the best manner.

Our process might be used without using our devices, and our devices might serve for some other process.

Figure 1:
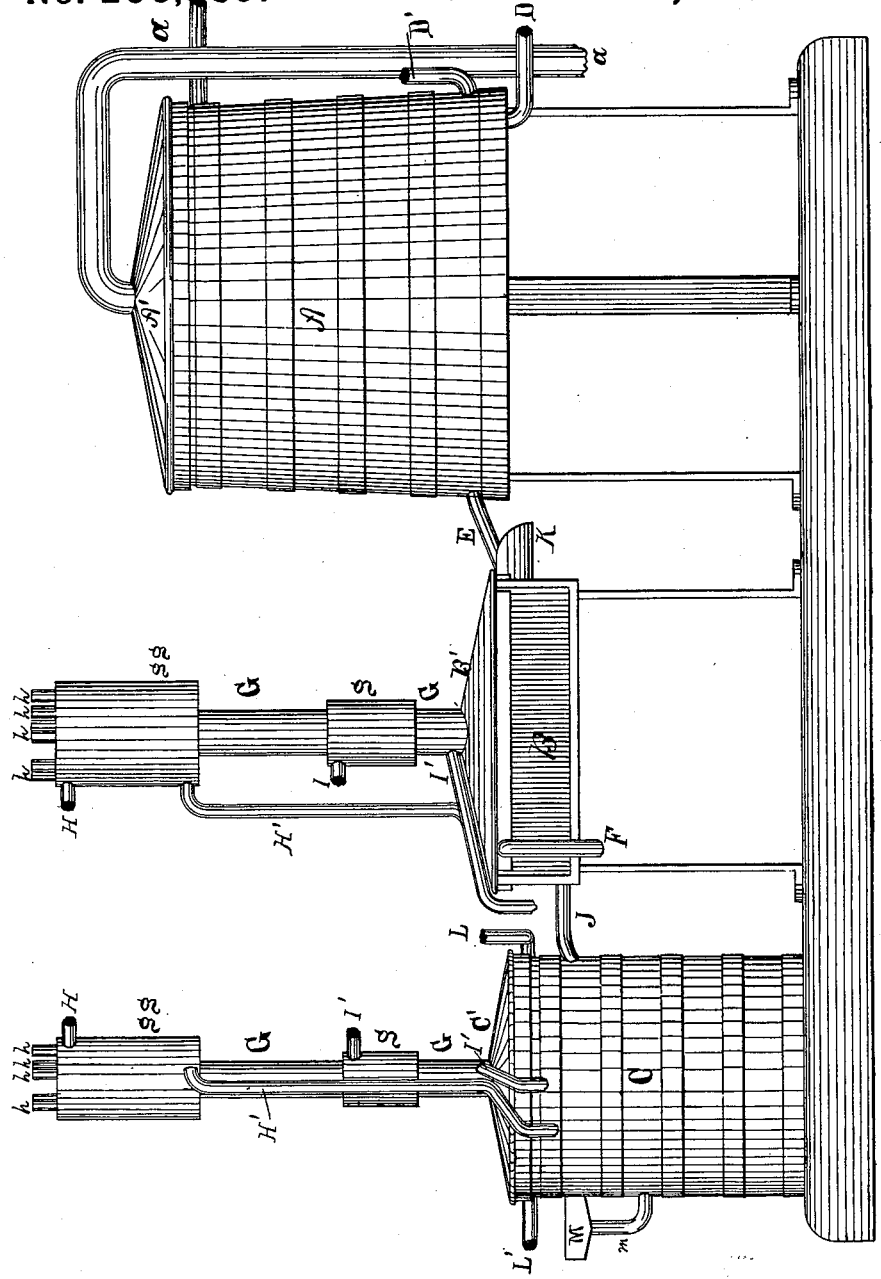
Figure 2:
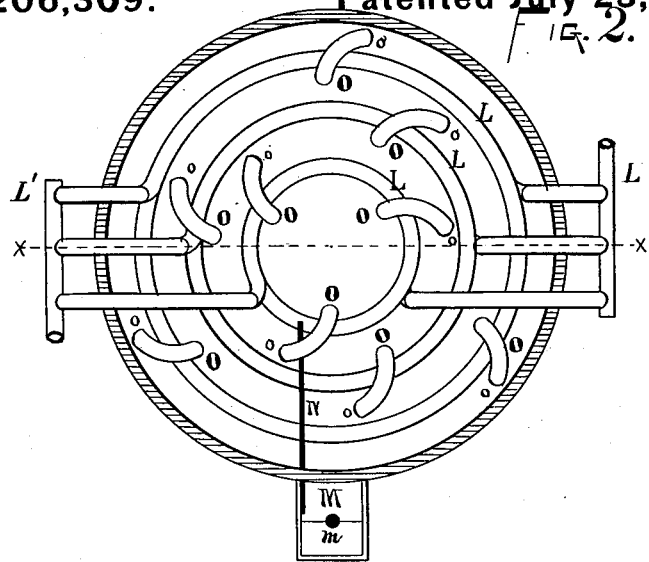
Figure 3:
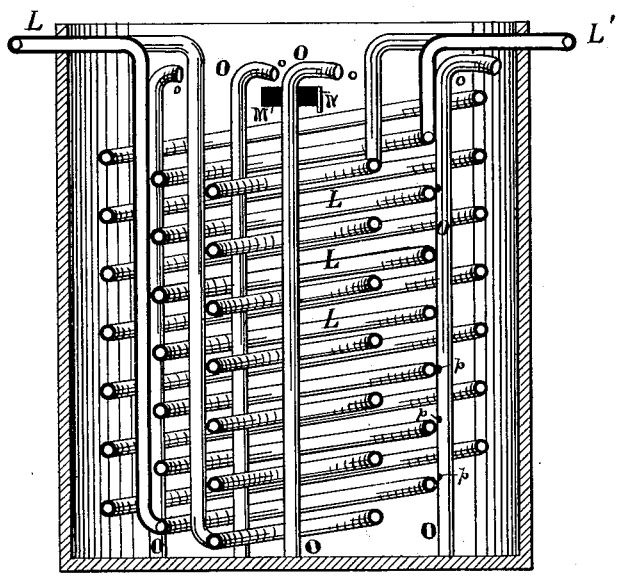

The accompanying drawings illustrate our invention, as follows, there being four sheets:

Figure 1 is a view, in elevation, showing the relation of the different parts of the apparatus to each other. Figs. 2 and 3 are views of what we call the "evaporator," Fig. 2 being a horizontal, and Fig. 3 a vertical, section, showing the part below line $x$ $x$, Fig. 2. Fig. 4 is a vertical section of the heater, and of a condensing device used on it and on the evaporators. Fig. 5 is a vertical section of the mixing or steeping tank.

First, of the process: Our process, as hereinafter more fully set forth, is, in short, as follows:

It may be said to consist of three stages: first, mixing the tar with hot water, and then steeping said mixture by the application of heat from a steam-coil submerged in the same, after which the mixture is allowed to cool and settle, when the tar rises to the surface, and the acid and water are drawn off from below the same; second, heating the liquor thus obtained—that is, the acid and water—in a shallow tank or pan by heat from a submerged steam-coil, and thereby expelling remaining particles of tar and dirt in the form of a scum; third, passing the liquor through evaporators until it is of so great strength as to require to be placed in platinum or glass stills, which evaporators are provided with steam-coils for heating.

The first of these stages is the most essential, and may be practiced without following the subsequent stages, and either of the subsequent stages would be valuable if the others were not followed.

The following is a more detailed description of these several stages:

The first takes place in tank A, which we call the "mixing and steeping tank." This tank is filled about half-full of water, which is then heated by the steam-coil to about 180°, and then an equal amount, in bulk, of tar is added. This mass of tar, acid, and water is then kept at about 180° of heat for about five hours.

By the use of the steam-coil for heating an even and perfectly-regulated heat is maintained, and the tar does not become carbonized, as is the case where direct heat from a furnace is applied to bottom of the tank containing the mixture. When the tar becomes carbonized, or cooked, or vulcanized, it destroys large amounts of acid by neutralization or decomposition, as is well known by chemists.

In all the stages of our treatment we use a steam-coil submerged in the liquor for heating it, and we find we are enabled thereby to reclaim fully forty per cent. more acid than by former processes from a given quantity of tar. At the end of the five hours the steam is shut off from the coil in tank A, and the mixture is allowed to settle. The acid having an affinity for water, and having been freed from the tar by the steeping and melting, it unites with the water, and the tar, being freed from the acid, and being then lighter than the acid and water, which have united, rises to the top of the said mixture of acid and water. The mixture of acid and water is then drawn off, either as wanted in the subsequent stages, or else into a storage-tank. By this first stage in the treatment nearly all the tar is removed; but the solution drawn off is not entirely free from it.

The second stage in the treatment consists in heating the solution or "acid water," as we will call it, in tank B. This tank is shallow. It is lined with lead, as are all the vessels we use, and it is provided with a pyramidal steam-coil, and has spillways on its sides, one or more, as may be desired. It also has an induct-pipe at its top and an educt-pipe at the bottom. After the liquor is thoroughly heated the induct and educt pipes are sufficiently opened to keep up a supply of liquor and to draw off a proper amount, and still allow the mass to be kept at an even temperature of about 250° of heat. The incoming and outgoing liquor is not sufficient in volume to disturb the whole mass, and, the coil being pyramidal in form, the heat produces a current from the bottom to the top and from the center to the sides, and thus the scum which arises, which is tar and dirt, is thrown to the sides, and, as the tank is kept even full to the spillway-lines, the scum floats over the spills and is thus removed. These spills are in effect scum-traps. By this treatment nearly all of the remaining tar is thrown off, and the liquor is somewhat condensed or made stronger by evaporation.

The third step or stage in the treatment is that of evaporating the water from the acid, which we do by heating with a steam-coil submerged, and will fully appear in the following description:

Second, of the devices used: The tank A, in which the first stage of the operation is performed, is of ordinary construction and of any desirable size. It is provided with a steam-coil, D D', which is of any desirable form or construction. It is also provided with an induct-pipe, P, for the admission of the tar, which is pumped through it, and hence enters the tank with more or less force. It is desirable that the tar, as it falls into the water, should be scattered or broken up, rather than enter in a solid mass. This is desirable, because it mingles the tar more perfectly with the water. Any device that will do this scattering will serve the purpose. We show an obstruction to the falling tar, consisting of a block, R, held upon legs or braces. We also also provide this tank with a cover, A', which has a gas-escape pipe, $a$, leading therefrom to the furnace under the boilers. This pipe $a$ carries off the gas generated by the steeping process.

The heater B is a shallow tank or pan. The steam-coil therein it is preferable to make in a pyramidal form, for the reasons above stated. This tank is provided with a cover, B', which has, like the covers of the evaporators C, a vapor-escape tube, G. The construction of this tube is shown in Fig. 4.

At a short distance above the cover the tube G is surrounded by a water-chamber, $g$, into which cold water enters through the pipe I. This serves as a condenser, to condense the water in the escaping vapor. This condensed liquid runs down the side of the tube and lodges on a ledge, $b$, of the top B', and thence runs off through the outlet I'. This condensed matter is nearly pure water.

At the top of the pipe G is another chamber, $g$ $g$, which is also filled with cold water, and has small escape-tubes $h$ $h$ $h$ leading through it for the vapor to pass through. In this chamber $g$ $g$ is a sub-chamber, H'', into which the condensed liquor drips, and from which it is carried off by the pipe H'. This condensed fluid is almost pure sulphuric acid, and is accordingly saved.

The evaporating-tanks are of any ordinary and convenient construction.

The steam-coil L, which we show here, is of three separate coils, the object of which is to get as much heating-surface as possible.

O are vertical pieces of pipe extending to the bottom and attached to the side of the coils. These are open at the top, and are provided with curves or elbows. They have openings $p$ $p$ $p$, as desired, along their sides, for the admission of the fluid. As these tubes get hot by their contact with the coils, it causes a flow of liquor up through them and out at their mouths $o$ $o$ $o$, &c. These nozzle-like ends $o$ $o$ $o$ all point in one circular direction, and the result of the streams of liquor pouring out of them is to keep the surface of the liquor in the tank moving in a circuit.

N is a wing extending from the side of the tank toward the center. This wing lies along the surface of the fluid and acts as a skimmer, the liquor being in motion circuitously. Any scum thus collected is thrown into the scum-trap M on the side of the tank. This trap or box is provided with a pipe, $m$, connecting the bottom thereof with the main tank C. By this means any acid liquor that may enter the trap will find its way back to the tank, while the scum will be dipped out of the trap by the attendant.

It will be observed, as we have before stated, that throughout the whole process the heating of the mixtures and the liquors is done by steam-coils, in place of the direct application of heat from a furnace to the vessel. By so doing we prevent carbonizing the tar, as above stated; also we secure a better or more perfect rendering of the acid from the tar, for the tar is more perfectly melted, not being burned, vulcanized, or cooked, but changed to its oily form, and thus brought in contact more perfectly with the water, which, having an affinity for the acid, takes it up. By the use of the steam-coil we also are enabled to do the necessary heating with great economy of fuel. We think a saving of seventy-five per cent. is effected in fuel.

It will also be observed that in every case, when the liquor is to be passed from one tank to another it is done by being drawn from the lower part of the discharging-tank. The object of this is to continually avoid the tar and dirt, which are lighter than the acid; so the partially-concentrated solution is continually flowing toward the next step or stage in the operation.

What we claim as our invention is—

1. In the process of reclaiming acid from the residuum-tar from refineries, and as part of said process, the mixing of said tar with hot water, and then steeping said mixture by the application of heat, and then allowing the mixture to settle, so that the acid and water can be drawn off from below the tar, substantially as set forth.

2. In the process of restoring acid from residuum-tar, and as part of said process, the heating of the solution derived from the first stage of said process, and the removal of the scum from the top, while the purer liquor escapes from the bottom of the vessel in which the operation takes place, as set forth.

3. An apparatus for treating residuum-tar from refineries for reclaiming the acid therein contained, which consists of the following devices, to wit: a mixing, steeping, and separating tank, A, provided with a steam-coil, D D', and an educt-pipe, E, at or near its bottom, a heating-tank, B, provided with an induct and educt pipe, as set forth, and a steam-heating coil, F F', and, lastly, one or more evaporating-tanks, C, provided with inducts and educts, as described, and a steam-coil for heating their contents, said parts being arranged with relation to each other, and operating together, substantially in the manner and for the purposes set forth.

4. The evaporating-tank C of an apparatus for reclaiming acid from residuum-tar, provided with a steam-coil, L, and circulating-tubes O, with deflected nozzles o, arranged as described, whereby the heat from the said coil shall cause the liquor to flow through the tubes O and deflected nozzles o in such a manner as gives to the liquor both a vertical and horizontal circulation, substantially as and for the purposes mentioned.

5. In combination with the circulating-tubes O, with nozzles o, arranged as described, the wing N and scum-trap M, substantially as and for the purposes mentioned.

In testimony whereof we, the said FERNANDO F. FARRAR and FRANK P. GILL, have hereunto set our hands.

FERNANDO F. FARRAR.
FRANK P. GILL.

Witnesses:
  JNO. K. HALLOCK,
  JOHN FERRIER.